US010489863B1

(12) United States Patent
Matheson (10) Patent No.: US 10,489,863 B1
(45) Date of Patent: Nov. 26, 2019

(54) ROOF INSPECTION SYSTEMS AND METHODS

(71) Applicant: United Services Automobile Association ("USAA"), San Antonio, TX (US)

(72) Inventor: Cory A. Matheson, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 383 days.

(21) Appl. No.: 15/165,854

(22) Filed: May 26, 2016

Related U.S. Application Data (60) Provisional application No. 62/167,085, filed on May 27, 2015.

(51) Int. Cl.
    *G06Q 40/08*    (2012.01)
    *G06Q 40/00*    (2012.01)
    *H04L 29/08*    (2006.01)

(52) U.S. Cl.
    CPC ............. *G06Q 40/08* (2013.01); *G06Q 40/12* (2013.12); *H04L 67/32* (2013.01)

(58) Field of Classification Search
    CPC ........ G06Q 40/00; G06Q 40/08; G06Q 40/12; H04L 67/32; H04L 29/08
See application file for complete search history.

(56) References Cited

U.S. PATENT DOCUMENTS

| 4,453,155 | A | * | 6/1984 | Cooper ................. A62C 37/44 |
| | | | | 169/13 |
| 5,724,261 | A | | 3/1998 | Denny |
| 6,526,807 | B1 | | 3/2003 | Doumit et al. |
| 6,766,322 | B1 | | 7/2004 | Bell |
| 6,826,607 | B1 | | 11/2004 | Gelvin et al. |
| 7,398,218 | B1 | | 7/2008 | Bernaski et al. |
| 7,406,436 | B1 | | 7/2008 | Reisman |
| 7,610,210 | B2 | | 10/2009 | Helitzer et al. |
| 7,711,584 | B2 | | 5/2010 | Helitzer et al. |
| 7,716,076 | B1 | | 5/2010 | Block et al. |
| 7,809,587 | B2 | | 10/2010 | Dorai et al. |

(Continued)

FOREIGN PATENT DOCUMENTS

WO     WO 2013/036677     3/2013

OTHER PUBLICATIONS

U.S. Appl. No. 14/494,207, filed Sep. 23, 2014, Campbell.

(Continued)

*Primary Examiner* — Kenneth Bartley
(74) *Attorney, Agent, or Firm* — Fish & Richardson P.C.

(57) ABSTRACT

Disclosed are computer implemented systems and methods for in situ inspection of a roof of a policy holder's dwelling. The inspection system establishes a baseline condition at a first point in time for the roof by scanning using one or more sensors to collect baseline condition data. The roof is scanned at a point in time subsequent to the first point in time to establish a present condition using the one or more sensors to collect present condition data. The baseline condition data and the present condition data are transmitted to a computing device which compares the baseline condition data with the present condition data to determine anomalies indicative of roof damage or deterioration and/or to determine repair needs for the roof.

24 Claims, 5 Drawing Sheets

(56) References Cited

U.S. PATENT DOCUMENTS

| | | | |
|---|---|---|---|
| 7,949,548 B2 | 5/2011 | Mathai et al. | |
| 8,004,404 B2 | 8/2011 | Izumi et al. | |
| 8,041,636 B1 | 10/2011 | Hunter et al. | |
| 8,086,523 B1 | 12/2011 | Palmer | |
| 8,106,769 B1* | 1/2012 | Maroney | G06Q 10/10 340/540 |
| 8,196,516 B2* | 6/2012 | Beselt | G01B 5/0009 104/95 |
| 8,229,767 B2 | 7/2012 | Birchall | |
| 8,271,303 B2 | 9/2012 | Helitzer | |
| 8,271,321 B1 | 9/2012 | Kastenbaum | |
| 8,289,160 B1 | 10/2012 | Billman | |
| 8,332,242 B1 | 12/2012 | Medina | |
| 8,400,299 B1 | 3/2013 | Maroney et al. | |
| 8,428,972 B1 | 4/2013 | Noles et al. | |
| 8,650,048 B1* | 2/2014 | Hopkins, III | G06Q 40/08 705/4 |
| 8,676,612 B2 | 3/2014 | Helitzer | |
| 8,719,061 B2 | 5/2014 | Birchall | |
| 8,731,975 B2 | 5/2014 | English et al. | |
| 8,760,285 B2 | 6/2014 | Billman et al. | |
| 8,774,525 B2 | 7/2014 | Pershing | |
| 8,788,299 B1 | 7/2014 | Medina | |
| 8,788,301 B1 | 7/2014 | Marlow | |
| 8,872,818 B2 | 10/2014 | Freeman | |
| 9,082,015 B2* | 7/2015 | Christopulos | G06K 9/00637 |
| 9,141,995 B1 | 9/2015 | Brinkmann | |
| 9,183,560 B2 | 11/2015 | Abelow | |
| 9,252,980 B2 | 2/2016 | Raman | |
| 9,454,907 B2* | 9/2016 | Hafeez | G08G 5/0034 |
| 9,481,459 B2* | 11/2016 | Staskevich | B64C 39/024 |
| 9,611,038 B2* | 4/2017 | Dahlstrom | B64C 39/024 |
| 9,754,325 B1* | 9/2017 | Konrardy | H04W 4/90 |
| 9,811,862 B1* | 11/2017 | Allen | G06Q 40/08 |
| 9,842,310 B2 | 12/2017 | Lekas | |
| 9,892,463 B1* | 2/2018 | Hakimi-Boushehri | G06Q 40/08 |
| 9,984,417 B1* | 5/2018 | Allen | G06Q 40/08 |
| 2002/0032586 A1 | 3/2002 | Joao | |
| 2002/0087364 A1 | 7/2002 | Lerner | |
| 2002/0103622 A1 | 8/2002 | Burge | |
| 2002/0178033 A1 | 11/2002 | Yoshioka | |
| 2003/0040934 A1 | 2/2003 | Skidmore | |
| 2003/0097335 A1 | 5/2003 | Moskowitz et al. | |
| 2004/0039586 A1 | 2/2004 | Garvey et al. | |
| 2004/0064345 A1 | 4/2004 | Ajamian et al. | |
| 2004/0172304 A1 | 9/2004 | Joao | |
| 2005/0050017 A1 | 3/2005 | Ross et al. | |
| 2005/0055248 A1 | 3/2005 | Helitzer et al. | |
| 2005/0197847 A1 | 9/2005 | Smith | |
| 2005/0262923 A1* | 12/2005 | Kates | F24F 11/30 73/29.01 |
| 2006/0026044 A1 | 2/2006 | Smith, II | |
| 2006/0218018 A1 | 9/2006 | Schmitt | |
| 2006/0235611 A1 | 10/2006 | Deaton | |
| 2007/0005400 A1 | 1/2007 | Eggenberger | |
| 2007/0005404 A1 | 1/2007 | Raz et al. | |
| 2007/0043803 A1 | 2/2007 | Whitehouse et al. | |
| 2007/0072541 A1* | 3/2007 | Daniels, II | F24F 7/02 454/365 |
| 2007/0088579 A1 | 4/2007 | Richards, Jr. | |
| 2007/0118399 A1 | 5/2007 | Avinash et al. | |
| 2007/0156463 A1 | 7/2007 | Burton | |
| 2007/0174467 A1 | 7/2007 | Ballou et al. | |
| 2008/0018138 A1* | 1/2008 | Vance | B60R 13/06 296/203.01 |
| 2008/0033847 A1 | 2/2008 | McIntosh | |
| 2008/0052134 A1 | 2/2008 | Nowak et al. | |
| 2008/0065427 A1 | 3/2008 | Helitzer et al. | |
| 2008/0086320 A1 | 4/2008 | Ballew et al. | |
| 2008/0114655 A1* | 5/2008 | Skidmore | G06Q 10/10 705/14.36 |
| 2008/0141595 A1* | 6/2008 | Lawler | E04D 13/064 52/15 |
| 2008/0154651 A1 | 6/2008 | Keneflick et al. | |
| 2008/0154686 A1 | 6/2008 | Vicino | |
| 2008/0164769 A1 | 7/2008 | Eck | |
| 2008/0244329 A1 | 10/2008 | Shinbo | |
| 2008/0282817 A1* | 11/2008 | Breed | B60C 11/24 73/865.9 |
| 2008/0306799 A1 | 12/2008 | Sopko, III | |
| 2009/0006175 A1 | 1/2009 | Maertz | |
| 2009/0109037 A1 | 4/2009 | Farmer | |
| 2009/0177302 A1* | 7/2009 | Kondo | H04N 5/232 700/94 |
| 2009/0177500 A1 | 7/2009 | Swahn | |
| 2009/0182528 A1* | 7/2009 | De Groot | G01B 11/06 702/167 |
| 2009/0188202 A1* | 7/2009 | Vokey | E04D 5/00 52/741.1 |
| 2009/0205054 A1 | 8/2009 | Blotenberg | |
| 2009/0265193 A1* | 10/2009 | Collins | G06Q 30/0185 705/4 |
| 2009/0265207 A1 | 10/2009 | Johnson | |
| 2009/0266565 A1 | 10/2009 | Char | |
| 2009/0279734 A1 | 11/2009 | Brown | |
| 2010/0131307 A1 | 5/2010 | Collopy et al. | |
| 2010/0174566 A1 | 7/2010 | Helizter et al. | |
| 2010/0241464 A1 | 9/2010 | Amigo | |
| 2010/0274859 A1 | 10/2010 | Bucuk | |
| 2011/0137684 A1 | 6/2011 | Peak et al. | |
| 2011/0137685 A1 | 6/2011 | Tracy et al. | |
| 2011/0161117 A1 | 6/2011 | Busque et al. | |
| 2011/0295624 A1 | 12/2011 | Chapin et al. | |
| 2011/0320226 A1 | 12/2011 | Graziano | |
| 2012/0016695 A1 | 1/2012 | Bernard | |
| 2012/0028635 A1 | 2/2012 | Borg et al. | |
| 2012/0101855 A1 | 4/2012 | Collins et al. | |
| 2012/0116820 A1 | 5/2012 | English et al. | |
| 2012/0158436 A1 | 6/2012 | Bauer et al. | |
| 2012/0176237 A1 | 7/2012 | Tabe | |
| 2012/0290333 A1 | 11/2012 | Birchall | |
| 2013/0040636 A1 | 2/2013 | Borg et al. | |
| 2013/0060583 A1 | 3/2013 | Collins | |
| 2013/0073073 A1 | 3/2013 | Hsu | |
| 2013/0144658 A1 | 6/2013 | Schnabolk | |
| 2013/0226624 A1 | 8/2013 | Blessman et al. | |
| 2013/0245796 A1 | 9/2013 | Lentzitzky | |
| 2013/0317732 A1 | 11/2013 | Borg et al. | |
| 2013/0342653 A1* | 12/2013 | McCloskey | G01S 17/026 348/46 |
| 2014/0046701 A1 | 2/2014 | Steinberg et al. | |
| 2014/0108275 A1 | 4/2014 | Heptonstall | |
| 2014/0114693 A1 | 4/2014 | Helitzer et al. | |
| 2014/0132409 A1 | 5/2014 | Billman et al. | |
| 2014/0136242 A1* | 5/2014 | Weekes | G06Q 40/08 705/4 |
| 2014/0142989 A1 | 5/2014 | Grosso | |
| 2014/0180723 A1 | 6/2014 | Cote | |
| 2014/0195272 A1 | 7/2014 | Sadiq | |
| 2014/0201315 A1 | 7/2014 | Jacob | |
| 2014/0257862 A1 | 9/2014 | Billman | |
| 2014/0257863 A1 | 9/2014 | Maastricht | |
| 2014/0270492 A1* | 9/2014 | Christopulos | G06K 9/00637 382/159 |
| 2014/0278573 A1 | 9/2014 | Cook | |
| 2014/0316614 A1* | 10/2014 | Newman | G06Q 30/0611 701/3 |
| 2014/0322676 A1 | 10/2014 | Raman | |
| 2014/0358592 A1* | 12/2014 | Wedig | G06Q 40/08 705/4 |
| 2014/0380264 A1 | 12/2014 | Misra | |
| 2015/0006206 A1 | 1/2015 | Mdeway | |
| 2015/0019266 A1* | 1/2015 | Stempora | G06Q 40/08 705/4 |
| 2015/0221051 A1 | 8/2015 | Settino | |
| 2015/0372832 A1 | 12/2015 | Kortz | |
| 2016/0005130 A1 | 1/2016 | Devereaux et al. | |
| 2016/0104250 A1 | 4/2016 | Allen et al. | |
| 2016/0110622 A1* | 4/2016 | Herring | G01G 19/4144 382/103 |

(56) References Cited

U.S. PATENT DOCUMENTS

| | | | |
|---|---|---|---|
| 2016/0163186 A1* | 6/2016 | Davidson | G06Q 50/16 340/506 |
| 2016/0239921 A1* | 8/2016 | Bray | G06Q 40/08 |
| 2017/0178424 A1 | 6/2017 | Wright | |

OTHER PUBLICATIONS

U.S. Appl. No. 14/941,225, filed Nov. 13, 2015, Billman et al.
U.S. Appl. No. 14/941,262, filed Nov. 13, 2015, Hopkins et al.
U.S. Appl. No. 14/862,776, filed Sep. 23, 2015, Devereaux et al.
U.S. Appl. No. 14/251,392, filed Apr. 11, 2014, Allen et al.
U.S. Appl. No. 14/251,377, filed Apr. 11, 2014, Devereaux et al.
U.S. Appl. No. 14/251,404, filed Apr. 11, 2014, Devereaux et al.
U.S. Appl. No. 14/251,411, filed Apr. 11, 2014, Allen et al.
U.S. Appl. No. 14/273,877, filed May 9, 2014, Allen et al.
U.S. Appl. No. 14/273,889, filed May 9, 2014, Devereaux et al.
U.S. Appl. No. 14/273,918, filed May 9, 2014, Allen et al.
U.S. Appl. No. 14/278,182, filed May 15, 2014, Allen et al.
U.S. Appl. No. 14/278,202, filed May 15, 2014, Allen et al.
U.S. Appl. No. 14/303,336, filed Jun. 12, 2014, Devereaux et al.
U.S. Appl. No. 14/303,347, filed Jun. 12, 2014, Devereaux et al.
U.S. Appl. No. 14/303,370, filed Jun. 12, 2014, Allen et al.
U.S. Appl. No. 14/303,382, filed Jun. 12, 2014, Allen et al.
U.S. Appl. No. 14/305,732, filed Jun. 16, 2014, Devereaux et al.
U.S. Appl. No. 14/324,534, filed Jul. 7, 2014, Devereaux et al.
U.S. Appl. No. 14/324,546, filed Jul. 7, 2014, Devereaux et al.
U.S. Appl. No. 14/324,609, filed Jul. 7, 2014, Devereaux et al.
U.S. Appl. No. 14/324,618, filed Jul. 7, 2014, Devereaux et al.
U.S. Appl. No. 14/324,748, filed Jul. 7, 2014, Devereaux et al.
U.S. Appl. No. 14/324,759, filed Jul. 7, 2014, Devereaux et al.
U.S. Appl. No. 14/573,981, filed Dec. 15, 2014, Allen et al.
U.S. Appl. No. 14/572,413, filed Dec. 16, 2014, Devereaux et al.
U.S. Appl. No. 15/365,555, filed Nov. 30, 2016, Devereaux et al.
U.S. Appl. No. 15/365,611, filed Nov. 30, 2016, Devereaux et al.
U.S. Appl. No. 15/365,676, filed Nov. 30, 2016, Devereaux et al.
U.S. Appl. No. 15/365,706, filed Nov. 30, 2016, Devereaux et al.
U.S. Appl. No. 15/365,721, filed Nov. 30, 2016, Devereaux et al.
U.S. Appl. No. 15/365,725, filed Nov. 30, 2016, Devereaux et al.
U.S. Appl. No. 15/365,736, filed Nov. 30, 2016, Devereaux et al.
U.S. Appl. No. 15/365,745, filed Nov. 30, 2016, Devereaux et al.
U.S. Appl. No. 15/365,754, filed Nov. 30, 2016, Devereaux et al.
U.S. Appl. No. 15/365,764, filed Nov. 30, 2016, Devereaux et al.
U.S. Appl. No. 15/365,786, filed Nov. 30, 2016, Devereaux et al.
U.S. Appl. No. 15/365,773, filed Nov. 30, 2016, Devereaux et al.
U.S. Appl. No. 15/244,847, filed Aug. 23, 2016, Devereaux et al.
U.S. Appl. No. 61/926,541, filed Jan. 13, 2014, Allen et al.
Telematics Set the Stage the Improved Auto Claims Management by Sam Friedman (Oct. 10, 2012); 3 pages.
Zevnik. Richard. The Complete Book of Insurance. Sphinx. 2004. pp. 76-78.
Farmers Next Generation Homeowners Policy, Missouri, by Farmers insurance Exchange; 2008; 50 pages.
Gonzalez Ribeiro, Ana, "Surprising things your home insurance covers," Jan. 12, 2012 in Insurance; 4 pages.

* cited by examiner

ROOF INSPECTION SYSTEMS AND METHODS

CROSS REFERENCE TO RELATED APPLICATIONS

This application claims priority to U.S. Patent Application Ser. No. 62/167,085 filed May 27, 2015 which is incorporated herein by reference in its entirety.

FIELD OF THE INVENTION

The disclosed embodiments generally relate to roof inspection systems and methods, and more particularly, to roof installed inspection systems that detect anomalies indicative of roof damage and which can communicate with cloud based servers for analytic purposes and methods for using the same.

BACKGROUND OF THE INVENTION

The failure to detect, identify and correct minor roof deterioration and leakage in the earliest stages is considered the greatest cause of premature roof failure. Even when properly designed and applied, all roofing materials deteriorate from exposure to the weather at rates determined largely by the kind of material used and the conditions of exposure.

Additionally, the tasks of climbing onto and inspecting a roof are inherently dangerous. Every year, thousands of people are injured or killed in falls from a ladder or off a roof.

Moreover, roofs often include a variety of shapes, features and obstacles. For example, a roof may have multiple peaks and valleys, a high slope or pitch, and may include numerous obstacles such as chimneys, vents, skylights, rain gutters, power lines, roof-mounted equipment, natural debris, and other objects. In addition to the dangers presented by these features, a roof inspector might not inspect areas of the roof that are difficult or dangerous to access. Still further, weather conditions can make the task more dangerous and/or delay the inspection.

Additionally, proper roof inspection techniques—especially safety precautions—require extensive training, physical endurance, and years of practice developing the necessary skills. Climbing and working safely on a roof requires large ladders, ropes, safety harnesses, and often a large truck to haul the equipment to the site. Providing a second person on site for assistance and safety adds cost to the process, without adding to the reliability of the final report.

For at least the reasons described above, personal roof inspection is dangerous, time consuming and expensive. Furthermore, aerial or satellite imaging of roof structures often produces low quality images, the equipment is subject to interference from cloud cover and trees, the cost is high, and it could take days or weeks to receive a report.

There is a need therefore for a cost effective, in situ, roof inspection system which effectively eliminates the need for insurance inspectors to climb onto the roof and which can detect, identify and report minor roof deterioration and leakage in the earliest stages.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer implemented method for in situ inspection of a roof of a policy holder's dwelling (or any homeowner) is disclosed which includes the steps of: establishing a baseline condition at a first point in time for the roof by scanning using one or more sensors to collect baseline condition data; transmitting to a computing device the baseline condition data; scanning the roof at a point in time subsequent to the first point in time to establish a present condition using the one or more sensors to collect present condition data; transmitting to the computing device the present condition data; and comparing with the computing device the baseline condition data with the present condition data to determine anomalies indicative of roof damage or deterioration.

It is envisioned that the computing device can be for example, a local computing device, a cloud server or a remote server maintained by an insurer.

In embodiments of the presently disclosed method a repair report is transmitted to the policy holder/homeowner and/or an insurer when an anomaly is detected.

It is envisioned that the scanning for present condition data can occur intermittently. Alternatively, the scanning for present condition data can be conducted after a severe weather event has occurred in a geographic region for the roof. Still further, the scanning for present condition data can occurs after a roof maintenance or repair event. Furthermore, the baseline condition can be reestablished after a roof maintenance or repair event occurs and the new baseline can be transmitted to the computing device. The present condition data collected by the scanning can used to create a roof wear profile.

It is further envisioned that a transport system or mount can be provided in order to facilitate moving, repositioning or articulating at least one of the one or more sensors, so as to allow for a complete profile of the roof to be generated.

Preferably, the comparison of the baseline condition data with the present condition data can be used to determine repair needs for the roof. The step of determining the repair needs can include analyzing the policy holder's insurance policy to determine whether the insurance policy covers said repair needs. Additionally, determining the age and condition of the roof of the policy holder's dwelling can be part of the method for determining the repair needs for the roof.

The presently disclosed method can also include the steps of calculating a value of an insurance claim corresponding to the determined repair needs and providing a notification to the policy holder indicating the determined repair needs. In embodiments of the present disclosure the notification can include a recommendation of one or more vendors to perform insurance related repairs based on the determined repair needs.

The present disclosure is further directed to a computer system for in situ inspection of a roof of a policy holder's dwelling or structure, which includes, inter alia, at least one sensor positioned on an interior of the roof for determining at a first point in time, baseline condition data for the roof and at one or more subsequent points in time, present condition data. The system further includes a computing device in communication with the at least one sensor, the computing device having a memory and a processing unit.

It is envisioned that the memory is configured to store instructions for the at least one sensor and to store the baseline condition data and present condition data received from the at least one sensor. It is further contemplated that the processor is disposed in communication with said memory, and the processor upon execution of the instructions is configured to cause the at least one sensor to obtain baseline condition data or present condition data.

In certain embodiments, the processor instructs the at least one sensor to collect present condition data intermittently. In this or alternative embodiments, the processor instructs the at least one sensor to collect present condition data after a severe weather event has occurred in a geographic region for the roof. Moreover, the processor can be configured to instruct the at least one sensor to collect present condition data after a roof maintenance or repair event.

Embodiments of the presently disclosed system can include a transmitter for communicating baseline or present condition data obtained by the at least one sensor to a cloud storage server.

In certain embodiments, the system includes a data analysis module which compares the baseline condition data with the present condition data to determine anomalies indicative of roof damage.

A transport system can be provided for moving, articulating and/or adjusting at least one or more of the sensors so as to allow for a complete profile of the roof to be generated.

It is envisioned that the one or more sensors used in the disclosed systems and methods can include one or more of a temperature sensor, a humidity sensor, a water detection sensor, a wind speed sensor, a motion sensor, an infrared sensor, a structural sensor, a multispectral sensor, an environmental sensor or an optical sensor.

In certain embodiments of the present invention, a power source can be provided for one or more of the sensors. The power source can be a solar power source, a battery or power obtained directly from the dwelling's power source or grid.

The present disclosure is further directed to a computer implemented method for processing insurance data, including, among other steps, receiving, by a processor, data from one or more sensor devices relating to a roof of a dwelling; performing, by a processor, analytical analysis on the received data to determine one or more insurance claim events identifying one or more potential insurance claims regarding the dwelling; receiving, by a processor, an insurance policy associated with the dwelling; analyzing, by a processor, the insurance policy to determine insurance coverage for the dwelling as prescribed by the insurance policy; applying, by the processor, predefined business rules using the determined one or more insurance claim events and the determined insurance coverage to determine if the insurance policy supports an insurance claim regarding the one or more insurance claim events; and determining, by a processor, a claim amount value for the insurance claim if it is determined supported by the insurance policy.

It is envisioned that the disclosed method can include determining, by a processor, one or more third party vendors regarding repairs to be made regarding the one or more insurance claim events.

The one or more insurance claim events can relate to a structural condition of the roof of the dwelling.

Moreover, the data received from the one or more sensor devices can be received from sensor devices that include one or more of the following detection sensor devices: infrared; temperature; humidity, water, wind speed; motion; structural; environmental; optical and camera.

BRIEF DESCRIPTION OF THE DRAWINGS

The accompanying appendices and/or drawings illustrate various non-limiting, examples, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is depicted as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention appertains. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

As used herein, the term "insurance" refers to a contract between an insurer, known as an insurance company, and an insured, also known as a policy holder, in which compensation is paid by the insurer to the insured for some specific losses in exchange of a certain premium amount periodically paid by the insured in past. Whenever the insured suffers some loss for which he/she has insured or holds policy, the insured may file an insurance claim to demand compensation for the loss.

Figure 1:
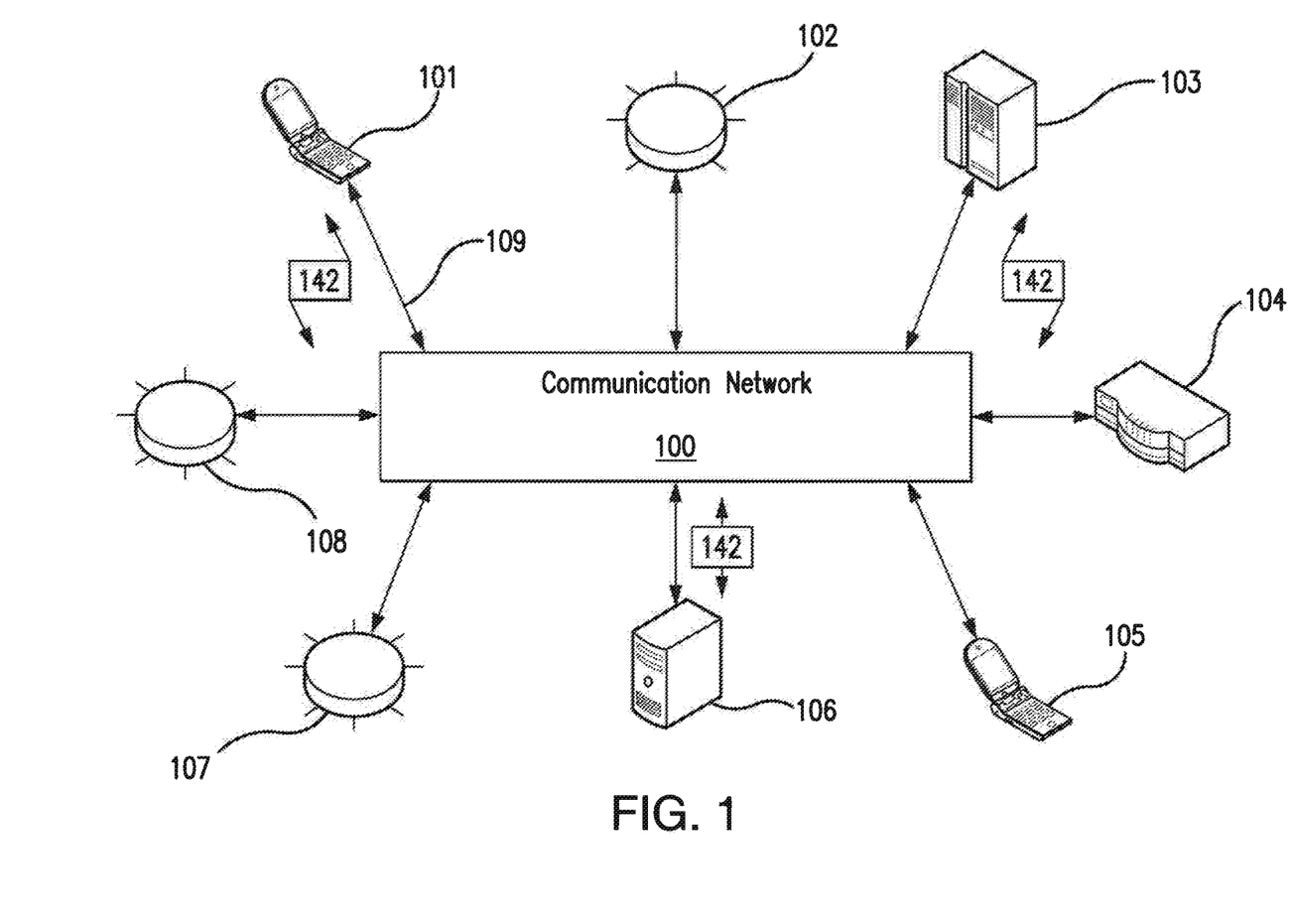
FIG. 1 illustrates an example communication network in accordance with an illustrated embodiment.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a dwelling or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, servers 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
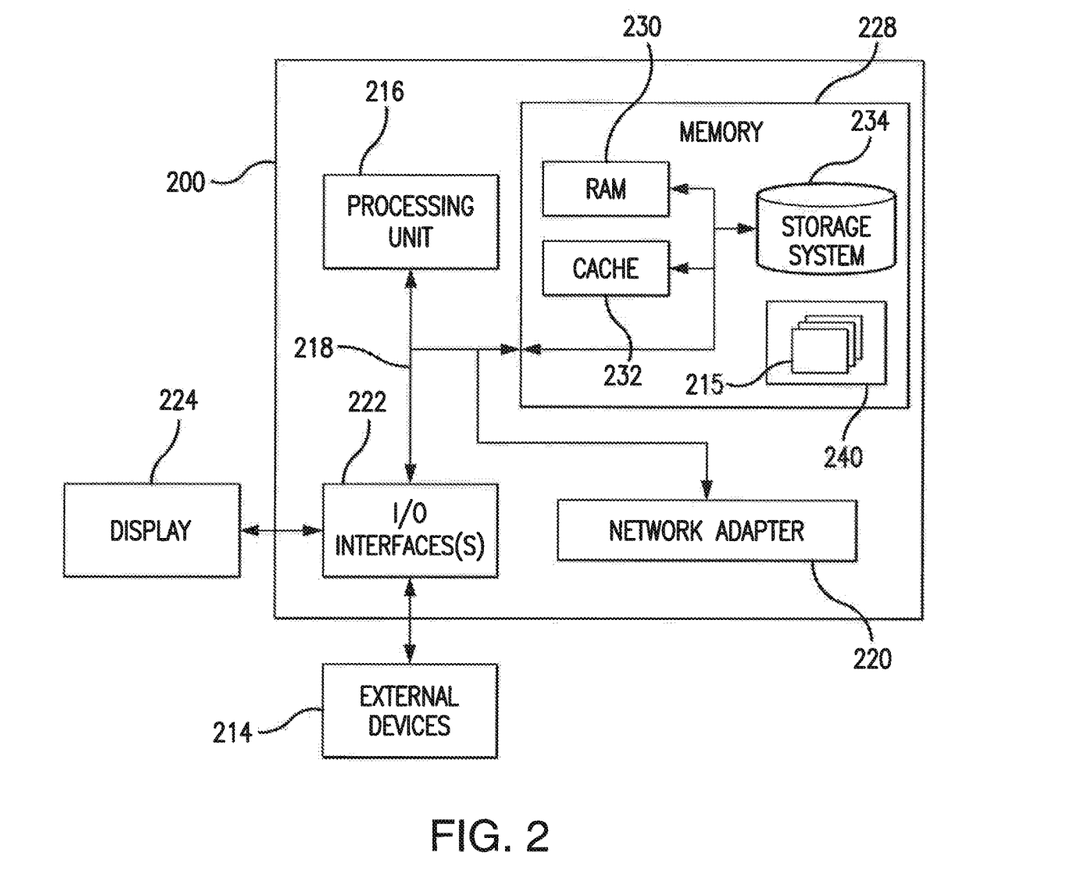
FIG. 2 illustrates a network computer device/node in accordance with an illustrated embodiment.

FIG. 2 is a schematic block diagram of an example network computing device 200 (e.g., one of network devices 101-108) that may be used (or components thereof) with one or more embodiments described herein, e.g., as one of the nodes shown in the network 100. As explained above, in different embodiments these various devices may be configured to communicate with each other in any suitable way, such as, for example, via communication network 100.

Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, sensor systems, network PCs, minicomputer systems, mainframe computer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as dwelling roof analyzer module 306 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
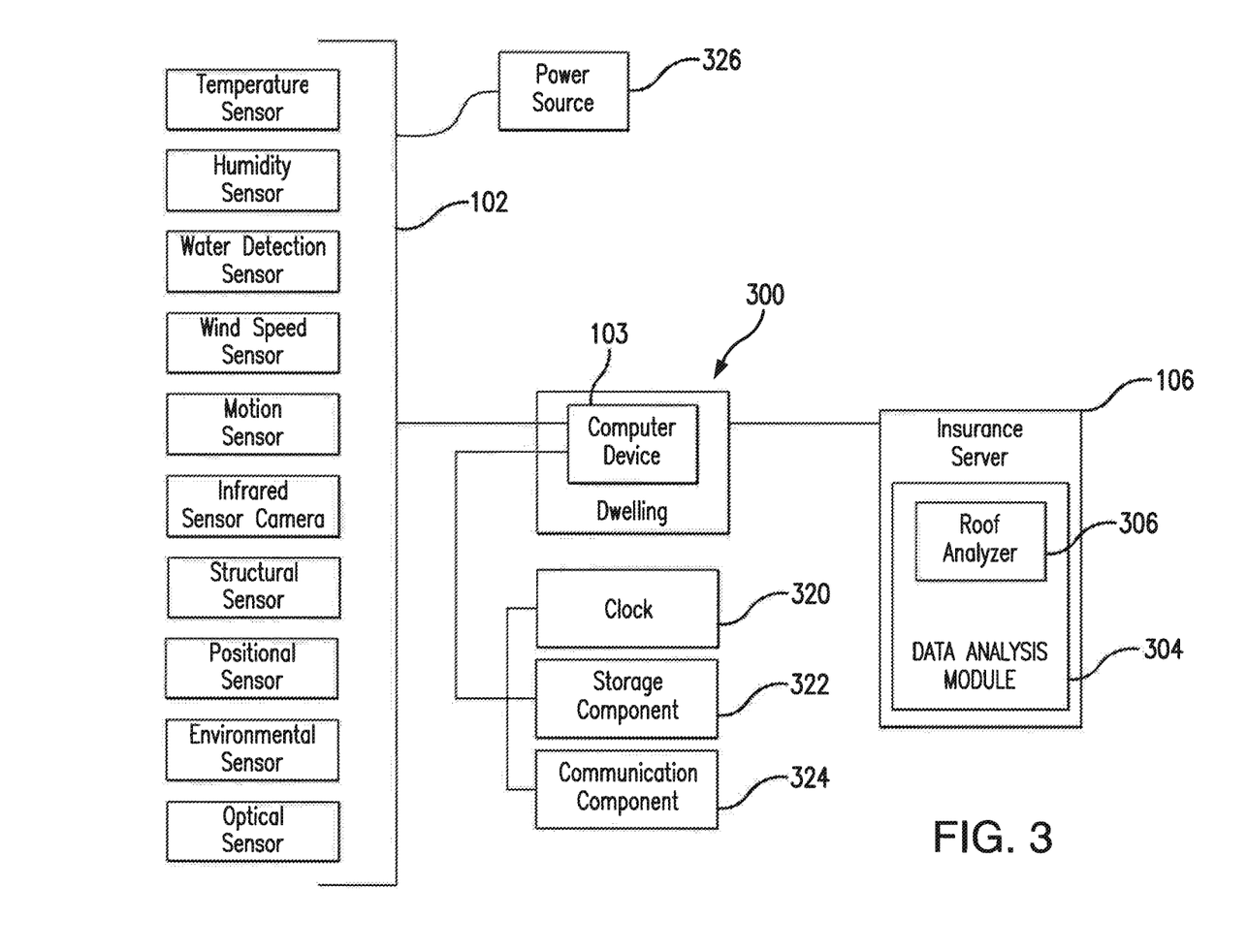
FIG. 3 is a block diagram of a dwelling from which sensor data is captured for subsequent analysis in accordance with an illustrated embodiment.

With the exemplary communication network 100 (FIG. 1) and computing device 200 (FIG. 2) being generally shown and discussed above, description of certain illustrated embodiments of the present invention will now be provided. With reference now to FIG. 3, an example of a dwelling 300 is shown which is to be understood to be any type of dwelling structure (e.g., residential, commercial, retail, municipal, etc.) in which the capture and analysis of sensor data (102) relating to the roof structure or environment is useful for the reasons at least described below. Dwelling 300 preferably includes a computing device 103 for capturing data from a plurality of sensors 102 which capture data regarding various aspects of roof of the dwelling 300, as further described below. It is to be understood that dwelling computing device 103 may be located in any location, and its position is not limited to the example shown.

Computing device 103 is preferably configured and operational to receive (capture) data from various sensors 102 regarding certain aspects (including for example, functional, environmental and structural aspects) of the roof of the dwelling 300 (described further below) and transmit that captured data to a remote server 106, via network 100. It is noted that computing device 103 may perform analytics regarding the captured sensor data relating to the roof of dwelling 300 and/or the remote server 106, preferably located or controlled by an insurance company/carrier, may perform such analytics, as also further described below. It is also to be understood that in other embodiments, data from sensors 102 may be transmitted directly to remote server 106, via network 100, thus either obviating the need for dwelling computing device 103 or mitigating its functionality to capture all data from sensors 102.

In the illustrated embodiment of FIG. 3, dwelling computing device 103 is shown coupled to various below described sensor types 102. Although various sensor types 102 are described below and shown in FIG. 3, the sensor types described and shown herein are not intended to be exhaustive as embodiments of the present invention may encompass any type of known or unknown sensor type which facilitates the purposes and objectives of the certain illustrated embodiments described herein. Exemplary sensor types include (but are not limited to):

Temperature Sensor—configured and operational to preferably detect the temperature present at or in the dwelling 300. The temperature measured could be the exterior temperature or the interior temperature (e.g., within the interior of the dwelling and/or the attic of the dwelling). For example, the temperature may rise and fall with the change of seasons and/or the time of day. The temperature sensor may make use of probes placed at various locations in the dwelling 300, in order to collect a representative profile of the temperature present in the dwelling 300, at the dwelling 300 or within the attic of the dwelling. These probes may be connected to device 103 by wire, or by a wireless technology. For example, if device 103 is positioned in the attic of the dwelling 300, the temperature may be higher than the general temperature present in the dwelling. Thus, probes placed at various locations (e.g., in the basement, on the various levels of a multi-level dwelling 300, in different rooms that receive different amounts of sun, etc.), in order to obtain an accurate picture of the temperature present at the dwelling.

As noted above, device 103 may record both the indoor and outdoor temperature present at the dwelling 300. For example, data about the indoor temperature, the outdoor temperature, and/or the differential between indoor and outdoor temperatures, may be used as part of an analysis model, and thus all of the different values could be stored. Device 103 may store an abstract representation of temperature (e.g., the average indoor temperature, as collected at all of the probes), or may store each temperature reading individually so that the individual readings may be provided as input to an analysis model.

Humidity sensor—configured and operational to preferably detect the humidity present in the attic of the dwelling 300. Humidity sensor may comprise the humidity-detection hardware, or may employ one or more remote probes, which may be located inside and/or outside the dwelling 300. Humidity readings from one or more locations inside and/or outside the dwelling could thus be recorded by device 103.

Water Detection sensor—configured and operational to preferably monitor water leaks or moisture in the attic space of the dwelling 300. Water detection sensor may have one or more probes/sensors attached to various structures in the roof of dwelling 300, and thus device 103 may record a potential water leak or area of moisture buildup in the roof.

Wind speed sensor—configured and operational to record the wind speed present at the dwelling 300. For example, one or more wind sensors may be placed outside the dwelling 300, at the wind speed and/or direction may be recorded at various points in time. Device 103 may record these wind speed and/or wind direction readings. The wind speed may be used by an analysis model for various purposes.

Motion sensor—configured and operational to sense motion in the roof structure or attic area of the dwelling 300 to which device 300 is attached. Typically, the roof structure of a dwelling does not move significantly, except in the event of a damage that may be caused by a weather event. Motion sensors can be used to detect if there has been any damage to the roof and may also be used to detect whether a rodent or other animal has gained access to the interior of the roof of dwelling 300.

Positional sensor—configured and operational to record the position of device 103. For example, the positional sensor may be, or may comprise, a Global Positioning System (GPS) receiver, which may allow the position of device 103 to be determined. Or, as another example, positional sensor may use triangulation technology that communicates with fixed points (such as wireless communication towers) to determine its position. While the roof of dwelling 300 normally does not move, as will be described in detail below, certain sensors used in the disclosed systems may be mounted on a moving support or vehicle in order to facilitate developing a complete profile of the roof. Positional sensors may record the position of device 103, which device 103 could communicate to an external source, thereby allowing the data obtained by device 103 to be correlated to a specific location in the roof.

Structural sensor—configured and operational to preferably detect various structural conditions relating to dwelling 300. A structural sensor may comprise detection hardware, or may employ one or more remote probes, which may be located inside and/or outside the roof of the dwelling 300. Conditions recorded by structural sensor may include (but are not limited to) the condition of the roof structure of dwelling 300, which may be achieved via: load bearing detectors; components which measure the slope of a beam/truss/joist etc. (e.g., via nano sensor), strain gauges or any another components functional to detect such conditions. Structural readings from one or more locations inside and/or outside the roof of the dwelling 300 could thus be recorded by device 103 and used by an analysis model in various ways.

Environmental Sensor—configured and operational to preferably detect various environmental conditions relating to dwelling 300. An environmental sensor may comprise detection hardware, or may employ one or more remote probes, which may be located inside and/or outside the dwelling 300. Conditions recorded by an environmental sensor may include (but are not limited to) the air quality present in roof of the dwelling 300, the presence of mold/bacteria/algae or any contaminant adverse to human health (whether airborne or attached to a portion of the roof structure of dwelling 300). Such environmental readings could thus be recorded by device 103 and used by an analysis model in various ways.

Infrared Sensor, IR Video or Still Camera—configured and operational to detect water leaks, energy leaks, energy host spots and unseen rodents or pests. The system and methods described below may use one of several types of infrared sensing devices in an in situ roof inspection.

These infrared sensors/cameras could be used to perform and interior or exterior scan. An interior scan of the roof would be more effective and preferable than an exterior scan because warm air escaping from a dwelling does not always move through the roof in a straight line. Heat loss detected in one area of the outside wall might originate at some other location on the inside of the wall. Also, it is harder to detect temperature differences on the outside surface of a dwelling during windy weather. Because of this difficulty, interior surveys are generally more accurate because they benefit from reduced air movement.

Specially designed infrared video or still cameras can be used to make images (called thermograms) that show surface heat variations. Infrared scanning cab be used to check the effectiveness of insulation in a dwelling's construction. The resulting thermograms can help determine whether a dwelling needs insulation and where in the dwelling it should go. Because wet insulation conducts heat faster than dry insulation, thermographic scans of roofs can often detect roof leaks.

There are several types of IR sensors or scanners. A spot radiometer (also called a point radiometer) is the simplest type of IR sensor. It measures radiation one spot at a time, with a simple meter reading showing the temperature of a given spot. An area within the roof is scanned with the device and differences in temperature are noted. A thermal line scanner shows radiant temperature viewed along a line. The thermogram shows the line scan superimposed over a picture of the panned area. This process shows temperature variations along the line. A thermal imaging camera produces a 2-dimensional thermal picture of an area showing heat leakage.

Optical Sensor—configured and operational to detect the presence of light within the roof which may be indicative of damage. An optical sensor converts light rays into electronic signals. It measures the physical quantity of light and then translates it into a form that is suitable for computational analysis.

With exemplary sensors 102 identified and briefly described above, and as will be further discussed below, it is to be generally understood sensors 102 preferably record certain data parameters relating to a dwelling's roof, including the past and present environment within and outside of the rood and the roof's structural and functional integrity. This data is provided by an insurance carrier, such as USAA, to determine maintenance and repair issues for the dwelling's roof; determine age and condition of a dwelling's roof; and other value added services such as those described below. It is to be understood and appreciated the aforementioned sensors 102 may be configured as wired and wireless types integrated in a networked environment (e.g., WAN, LAN, WiFi, 802.11 X, 3G, LTE, etc.), which may also have an associated IP address. It is to be further appreciated the sensors 102 may consist of internal sensors located within the roof or attic of dwelling 300; external sensors located external of the structure of dwelling 300; sound sensors for detecting ambient noise (e.g., for detecting termite and rodent activity, glass breakage, intruders, etc.); camera sensors such as those consisting of camera standalone devices, or by integrating into existing camera devices in a dwelling 300.

It is additionally to be understood and appreciated that sensors 102 can be networked into a central computer hub (e.g., device 103) in a dwelling to aggregate collected sensor data packets. Aggregated data packets can be analyzed in either a dwelling computer system (e.g., device 103) or via an external computer environment (e.g., server 106). Additionally, it is to be understood data packets collected from sensors 102 can be aggregated in dwelling computing device 103 and send as an aggregated packet to server 106 for subsequent analysis whereby data packets may be transmitted at prescribed time intervals (e.g., a benefit is to reduce cellular charges in that some dwellings 300 may not have Internet access or cellular service is backup when dwelling Internet service is nonfunctioning).

It is additionally to be understood and appreciated that sensors 102 can be powered using a variety of know techniques. For example, power source 326 can be a solar power source, a battery or could be a hardwired source obtained from the dwelling's power grid or electrical outlets.

Energy scavenging technics could also be used to create power for the sensors. With the adoption of new wireless protocols and improvements in transceiver technology, wireless networks for distributed sensors are quickly becoming commonplace. As the power usage increases, energy scavenging can effectively provide a virtually perpetual energy source that does not require frequent maintenance. Thermoelectric (TE) energy harvesting can be a good source of power when modest heat sources are available and when light or vibration energy is unavailable. For example, the attic space of a roof often becomes very hot in the summer and the heat could be converted by a TE generator into power for the sensors.

In accordance with an illustrated embodiment, in addition to the aforementioned, the sensors 102 being utilized relative to the roof of dwelling 300, dwelling computing device 103 may additionally be coupled to a Clock 320 which may keep track of time for device 103, thereby allowing a given item of data to be associated with the time at which the data was captured. For example, device 103 may recurrently capture readings of temperature, wind speed, humidity, etc., and may timestamp each reading. The time at which the readings are taken may be used to reconstruct events or for other analytic purposes, such as those described below. For example, the timestamps on roof structure readings taken by a structural sensor during a hurricane may allow it to be determined, after the hurricane has occurred, if the roof is in need of immediate repair.

A storage component 322 may further be provided and utilized to store data readings and/or timestamps in device 103. For example, storage component 322 may comprise, or may otherwise make use of, magnetic or optical disks, volatile random-access memory, non-volatile random-access memory, or any other type of storage device. There may be sufficient data storage capacity to store several hours or several days worth of readings.

A communication component 324 may further be provided and utilized to communicate recorded information from dwelling computing device 103 to an external location, such as computer server 106, which may be associated with an insurance carrier such as USAA. Communication component 324 may be, or may comprise, a network communication card such as an Ethernet card, a WiFi card, or any other communication mechanism. However, communication component 324 could take any form and is not limited to these examples. Communication component 324 might encrypt data that it communicates, in order to protect the security and/or privacy of the data.

Communication component 324 may communicate data recorded by device 103 (e.g., data stored in storage component 322) to an external location, such as server 106. For example, server 106 may be operated by an insurance company, and may collect data from dwelling computing device 103 in order to learn about maintenance/repair needs and other analytics relative to dwelling 300 in which device 103 located. Communication component 324 may initiate communication sessions with server 106. Or, as another example, server 106 may contact device 103, through communication component 324, in order to receive data that has been stored by device 103. Additionally, data from sensors 102, clock 320 and/or storage component 322 may be communicated directly to server 106, via network 100, thus obviating or mitigating the need for dwelling computing device 103.

In the example of FIG. 3, communication component 324 (which is shown, in FIG. 3, as being part of, or used by, dwelling computing device 103) communicates data to server 106. Server 106 may comprise, or otherwise may cooperate with, a data analysis module 304, which may analyze data in some manner. Data analysis module 304 may comprise various types of sub-modules, such as dwelling roof analyzer 306. In general, dwelling roof analyzer 306 may perform an analysis of collected data regarding various aspects of dwelling 300, such as data that used to determine age and condition of the roof of dwelling 300; determine maintenance and repair needs for the roof of dwelling 300 and the like.

Figure 4:
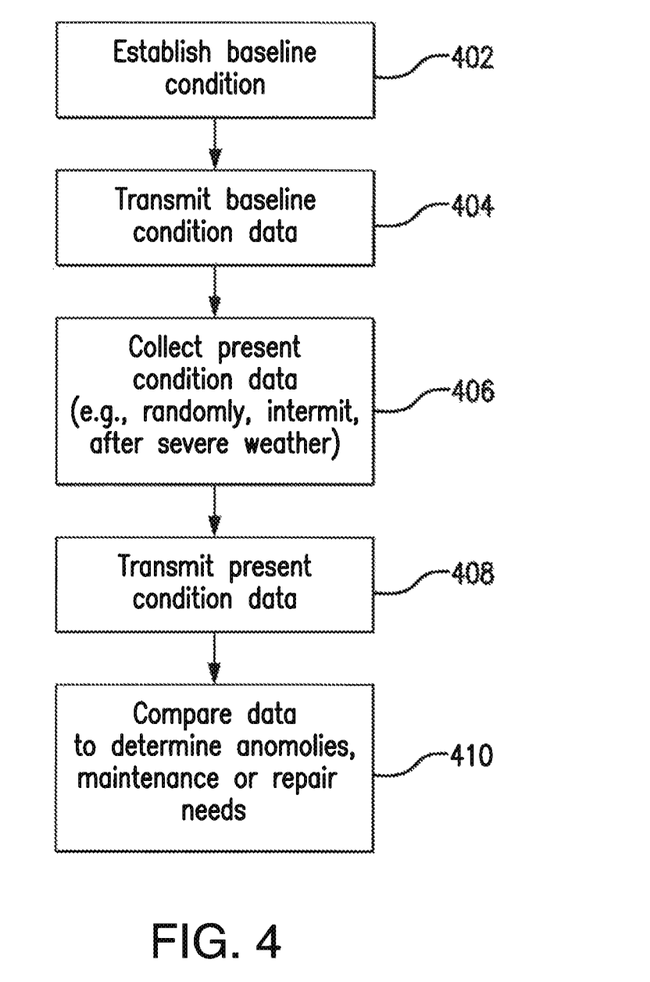
FIG. 4 is a flow diagram of the operational steps of the in-situ roof monitoring system in accordance with an illustrated embodiment.

With reference to FIG. 4 which provides a flow diagram of certain operational steps of the in-situ roof monitoring system in accordance with an illustrated embodiment. It should be appreciated that these operational steps may be carried out in any system and are not limited to the scenario shown in the aforementioned figures. Additionally, the flow diagram in FIG. 4 shows an example in which operational steps are carried out in a particular order, as indicated by the lines connecting the blocks, but the various steps shown in these diagrams can be performed in any order, or in any combination or sub-combination. It is to be appreciated the illustrated embodiments are not to be limited to a "policy holder's" dwelling but may be applicable to any homeowner having a need for roof inspection as described herein.

In the disclosed computer implemented method for in situ inspection of a roof of a policy holder's dwelling at 402 a baseline condition is first established at a first point in time for the roof by scanning using one or more of sensors 102 to collect baseline condition data. At 404, the baseline condition data is transmitted to computing device 103. As described previously, computing device 103 can be, for example, located within the dwelling, a cloud server based computing device or a remotely located computing device which is administered by the insurer.

At 406 present condition data is collected by scanning the roof at a point in time subsequent to the baseline scan. It is envisioned that the scanning for present condition data can occur intermittently, a severe weather event has occurred in a geographic region for the roof, after roof maintenance or a repair event or any combination thereof.

The present condition data collected by the sensors is transmitted at 408 to the computing device. The periodicity of the transmission can be pre-established or performed upon request. For example, this transmission can be accomplished each time present condition data is collected, upon request from the computing device or after several intermittent scans have been performed.

At 410 the computing device compares the baseline condition data with the present condition data to determine anomalies indicative of roof damage or deterioration.

Those skilled in the art would appreciate that it may be advantageous to reestablished the baseline condition after a roof maintenance or repair event occurs and to transmit the new baseline to the computing device. Moreover, the system can be used to verify if the repairs or maintenance to the roof has been performed in a satisfactory manner.

Preferably the system creates a repair report based upon the collected data which can be transmitted to the policy holder and/or an insurer when an anomaly is detected.

In certain constructions, the present condition data collected by the scanning can be used to create a roof wear profile.

It certain roof constructions, it may be necessary to construct a transport system, such as a rail system, which allows a particular sensor (e.g. the infrared sensor) to be moved, reposition, articulated, etc. within the attic of the dwelling. The transport system would prevent the need for multiple sensors to be used in order to conduct a complete review of the roof.

Figure 5:
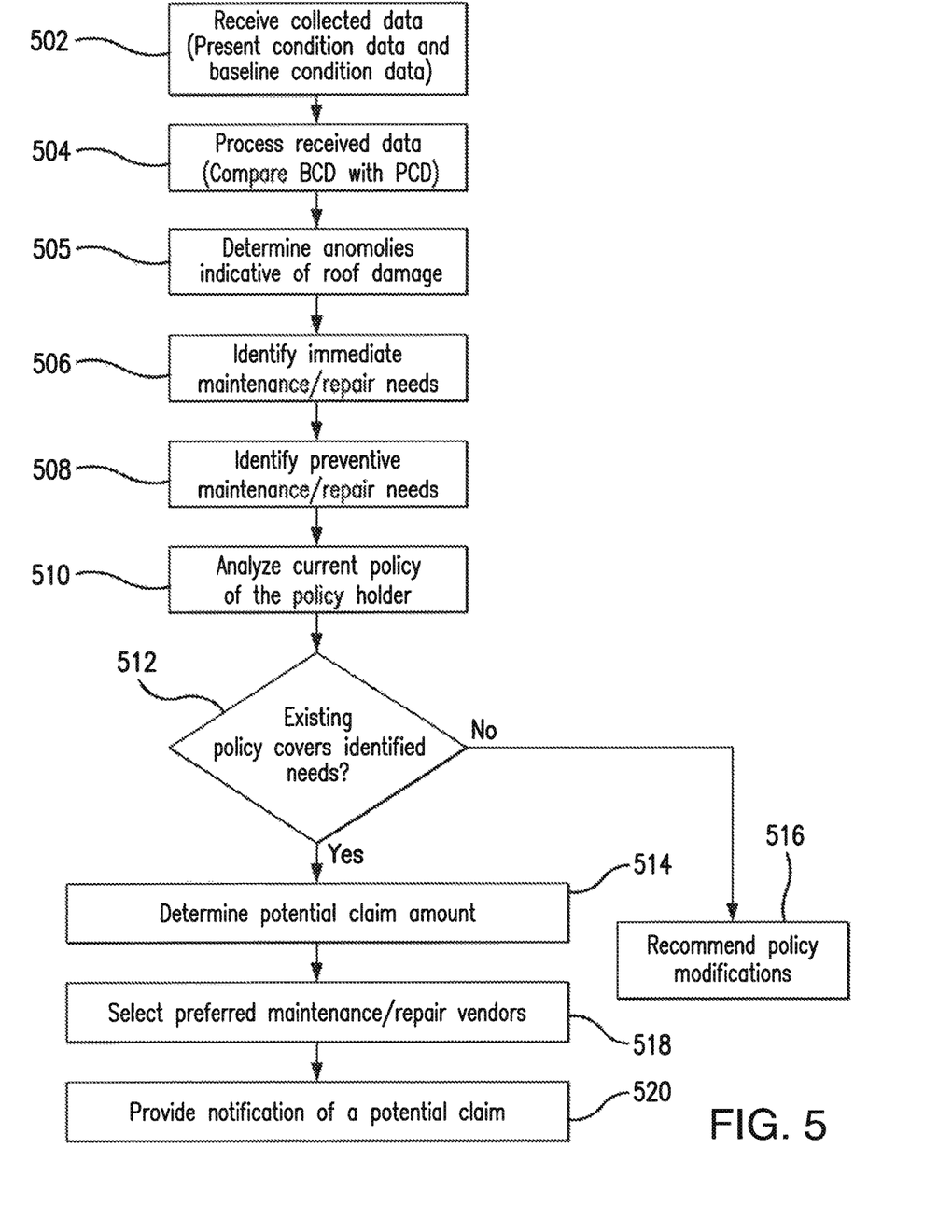
FIG. 5 is a flow diagram of operational steps of a dwelling roof analyzer module which can be using in conjunction with the in-situ roof monitoring system of FIG. 4 in accordance with an illustrated embodiment.

FIG. 5 also shows, in the form of a flow chart, exemplary operational steps of the dwelling roof analyzer 306. Before turning to the description of FIG. 5, it is noted that the flow diagram shown therein is described, by way of example, with reference to components shown in FIGS. 1, 2 and 3, although these operational steps may be carried out in any system and are not limited to the scenario shown in the aforementioned figures. Additionally, like FIG. 4, the flow diagram in FIG. 5 shows an example in which operational steps are carried out in a particular order, as indicated by the lines connecting the blocks, but the various steps shown in these diagrams can be performed in any order, or in any combination or sub-combination.

With reference to FIG. 5, at 502, dwelling roof analyzer 306 preferably collects data from sensors 102. In an embodiment of the present invention, this step may involve computing device 103 periodically contacting (via network 100), at prescribed time intervals, data analyzer module 304 running on server 106 to send accumulated data. In an alternative embodiment, contact between the dwelling computing device 103 and dwelling roof analyzer 306 may be initiated when the dwelling roof analyzer 306 contacts the dwelling computing device 103. Following the initial contact, dwelling roof analyzer 306 may receive data from the dwelling computing device 103. It is to be understood data packets collected from sensors 102 can be aggregated in dwelling computing device 103 and send as an aggregated packet to dwelling roof analyzer 306 for subsequent analysis.

At 504, dwelling roof analyzer 306 preferably processes the received data in the manner as discussed with respect to FIG. 4, by comparing the present condition data to the baseline condition data. Dwelling roof analyzer 306 may include a parser configured to parse the aggregated packet and classify the received data based on, for example, type of sensor employed to collect a particular subset of the received data. Dwelling roof analyzer 306 may create a data structure for each classification. This step may further involve identifying a policy holder associated with dwelling 300 from which the received data is collected.

At 506, based on data collected from sensors 102 regarding a dwelling 300, dwelling roof analyzer 306 conducts an analysis to determine recommendations to make certain immediately needed repairs to the structure of a dwelling 300. For instance a hole may have been detected in the roof of dwelling 300 (via one or more sensors 102), requiring immediate repair. As another example, one or more infrared sensors may have detected a water leak, energy leak, or energy host spot. An environmental sensor may have detected a water leak or any contaminant, such as mold, which adverse to human health. As another example, dwelling roof temperature analysis may have detected excessive cold temperatures within the attic of the dwelling which could be indicative of a roof leak or insulation degradation. In general, any roof condition that affects the residents' health or safety may be considered by dwelling roof analyzer 306 as requiring an immediate repair. Similarly, at 508, dwelling roof analyzer 306 conducts an analysis to identify certain preventive repairs to the roof structure of a dwelling 300. For example, based upon certain analysis, dwelling roof analyzer 306 may recommend preventive maintenance to the roof a dwelling 300 (e.g., detection of wind, moisture, improper roof slope line, etc.). As another example, based upon, for example, an air flow analysis, dwelling roof analyzer 306 may have detected that damaged frames and/or shingles allow air leaks into dwelling 300. Thus, dwelling roof analyzer 306 may make recommendations with regards to shingle replacement/repair needs.

At 510, dwelling roof analyzer 306 preferably analyzes current policy of a policy holder residing at dwelling 300 with respect to either immediate and/or preventive needs identified at steps 506 and 508. For example, dwelling roof analyzer 306 may determine whether policy holder's current policy covers any of the identified maintenance/repair needs. In response to determining that the current policy does not cover identified immediate/preventive repair and/or maintenance issues (step 512, no branch), dwelling roof analyzer 306, at 516, preferably recommends one or more current policy modifications based on the analysis performed at step 510. For example, if dwelling roof analyzer 306 determines that the current policy of the dwelling resident does not cover any of the preventive repairs, a recommendation may be made to add such coverage to the pre-existing policy.

In response to determining that current policy covers some or all of the identified immediate/preventive repair and/or maintenance needs (step 512, yes branch), dwelling roof analyzer 306, at 514, preferably determines potential claim amount. For example, dwelling roof analyzer 306 may determine the total amount of benefits potentially payable on claims associated with identified needs, if the policyholder chooses to make one or more claims against the insurance policy. In this step, dwelling roof analyzer 306 may derive the total amount of benefits based upon, for example, the total repair estimate amount. The total repair estimate amount may include both a labor estimate and a parts estimate.

At 518, dwelling roof analyzer 306 preferably selects one or more preferred maintenance/repair vendors. Maintenance/repair vendors are separate entities, each with the capability to perform a particular type of repair. For example, one vendor may specialize in insurance restoration work on roofing and gutters. Another vendor may have the capability to repair or replace roof insulation. Thus, dwelling roof analyzer 306 may select one or more preferred vendors based, at least in part, on data collected from sensors 102. In an embodiment of the present invention, the preferred vendors can have exclusive capabilities, meaning that the capability to handle any one particular repair by one vendor is not shared by the remaining vendors. In an alternative embodiment, the preferred vendors can have nonexclusive capabilities, meaning that the capability to handle any one repair service by any one vendor is shared by one or more remaining vendors. Moreover, the capabilities of various vendors to handle the same type of repair may involve different technologies and charges (i.e., costs). The preferred vendor list may be stored, for example, in insurance server 106 database.

At 520, dwelling roof analyzer 306 preferably provides a notification of a potential claim against the policyholder's insurance policy. It is to be appreciated that dwelling roof analyzer 306 may be configured to deliver all notifications regarding the potential claim corresponding to the determined repair/maintenance services electronically. The notification can be anything that advises a policy holder, device, or computer system of the maintenance/repair issue, including but not limited to, a display of text on a local display screen, a message in an email sent to a local or remote computer, a text message, a communication to a remote computer system. The electronic delivery may include integration of notification functionalities. It is to be also understood and appreciated that dwelling roof analyzer 306 may be configured and operational to integrate with policy holder's communicative computing devices (e.g., smart phones (via an app), computers, tablets, smart TV's, vehicle communication systems, etc.) for sending such notifications regarding such potential insurance claims. In an embodiment of the present invention, each notification may include, but not limited to, one or more immediate repair and/or preventive repair (maintenance) needs, the total amount of benefits potentially payable on corresponding claim(s), preferred repair/maintenance vendors and any additional information related to the potential insurance claim.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer implemented method for in situ inspection of a roof of a building, the method performed by at least one computing device and comprising:
receiving, by the at least one computing device, baseline condition data that is generated by sensors scanning at least a portion of the roof during a first period of time, wherein the baseline condition data is communicated, over at least one network to the at least one computing device, as a first aggregate data packet, wherein at least one of the sensors is movable by a rail system in the building to scan multiple portions of the roof, and wherein the baseline condition data includes baseline structural data that is generated by at least one structural sensor that is arranged in the building to physically measure structural elements of the building, including one or more of a slope of a structural element, a load on a structural element, and a strain on a structural element;
determining, by an analyzer module executing on the at least one computing device, a baseline condition of the roof, the baseline condition determined by the analyzer module based on analyzing the baseline condition data;
receiving, by the at least one computing device, present condition data that is generated by the sensors scanning at least the portion of the roof during a second period of time subsequent to the first period of time, wherein the present condition data is communicated, over the at least one network to the at least one computing device, as a second aggregate data packet and wherein the present condition data includes present structural data that is generated by the at least one structural sensor;
determining, by the analyzer module executing on the at least one computing device, a present condition of the roof, the present condition determined by the analyzer module based on analyzing the present condition data;
comparing, by the analyzer module executing on the at least one computing device, the baseline condition data with the present condition data to determine, based on one or more differences between the baseline condition data and the present condition data including a difference in the measured structural element one or more anomalies that are indicative of a deviation of the present condition from the baseline condition that indicates at least one of roof damage or roof deterioration; and
transmitting, by the at least one computing device, a report that describes the deviation of the present condition from the baseline condition.

2. The method as recited in claim 1, further comprising the step of transmitting a repair report to one or more of a policy holder and an insurer responsive to an anomaly being detected.

3. The method as recited in claim 1, wherein the scanning for present condition data occurs intermittently.

4. The method as recited in claim 1, wherein the scanning for present condition data occurs after a severe weather event has occurred in a geographic region for the roof.

5. The method as recited in claim 1, wherein the scanning for present condition data occurs after a roof maintenance or repair event.

6. The method as recited in claim 1, wherein the baseline condition is reestablished after a roof maintenance or repair event occurs and retransmitted to the at least one computing device.

7. The method as recited in claim 1, wherein present condition data collected by the scanning over an evaluation period is used by the at least one computing device to create a roof wear profile.

8. The method as recited in claim 1, wherein the at least one sensor that is movable by the rail system allows for a complete profile of the roof to be generated.

9. The method as recited in claim 1, wherein the comparison of the baseline condition data with the present condition data is used to determine repair needs for the roof.

10. The method as recited in claim 9, wherein determining repair needs comprises analyzing an insurance policy to determine whether said insurance policy covers said repair needs.

11. The method recited in claim 9, wherein determining repair needs comprises determining the age and condition of the roof.

12. The method as recited in claim 9, further comprising the step of calculating a value of an insurance claim corresponding to the determined repair needs.

13. The method as recited in claim 12, further comprising providing a notification to a policy holder indicating the determined repair needs.

14. The method as recited in claim 1, wherein the at least one computing device is one or more of a local computing device, a cloud server, and a remote server maintained by an insurer.

15. The method as recited in claim 13, wherein the notification includes a recommendation of one or more vendors to perform insurance related repairs based on the determined repair needs.

16. A computer system for in situ inspection of a roof of a building, the system comprising:
a plurality of sensors positioned on an interior of the roof, the sensors including: i) at least one movable sensor that is movable by a rail system in the building to scan multiple portions of the roof, and ii) at least one structural sensor that is arranged in the building to physically measure structural elements of the building, including one or more of a slope of a structural element, a load on a structural element, and a strain on a structural element; and
a computing device in communication with the sensors, the computing device including memory and a processing unit, wherein the memory is configured to store instructions for the sensors and to store baseline condition data and present condition data received from the sensors, and wherein the processor is disposed in communication with said memory, and the processor upon execution of the instructions is configured to perform operations including:
receiving the baseline condition data that is generated by the sensors scanning at least a portion of the roof during a first period of time, wherein the baseline condition data is communicated, over at least one network to the computing device, as a first aggregate data packet, wherein the baseline condition data includes baseline structural data that is generated by at least one structural sensor;

determining a baseline condition of the roof, the baseline condition determined by an analyzer module based on analyzing the baseline condition data;

receiving present condition data that is generated by the sensors scanning at least the portion of the roof during a second period of time subsequent to the first period of time, wherein the present condition data is communicated, over the at least one network to the at least one computing device, as a second aggregate data packet wherein the present condition data includes present structural data that is generated by the at least one structural sensor;

determining a present condition of the roof, the present condition determined by the analyzer module based on analyzing the present condition data;

comparing the baseline condition data with the present condition data to determine, based on one or more differences between the baseline condition data and the present condition data including a difference in the measured structural element, one or more anomalies that are indicative of a deviation of the present condition from the baseline condition that indicates at least one of roof damage or roof deterioration; and transmitting a report that describes the deviation of the present condition from the baseline condition.

17. The system as recited in claim 16, further comprising a transmitter for communicating condition data obtained by at least one of the sensors to a cloud storage server.

18. The system as recited in claim 16, further comprising the analyzer module which compares the baseline condition data with the present condition data to determine anomalies indicative of roof damage.

19. The system as recited in claim 16, wherein the processor instructs at least one of the sensors to collect present condition data intermittently.

20. The system as recited in claim 16, wherein the processor instructs at least one of the sensors to collect present condition data after a severe weather event has occurred in a geographic region for the roof.

21. The system as recited in claim 16, wherein the processor instructs at least one of the sensors to collect present condition data after a roof maintenance or repair event.

22. The system as recited in claim 16, wherein the at least one sensor that is movable by the rail system allows for a complete profile of the roof to be generated.

23. The system as recited in claim 16, wherein the sensors further include one or more of a temperature sensor, a humidity sensor, a water detection sensor, a wind speed sensor, a motion sensor, an infrared sensor, an environmental sensor, and an optical sensor.

24. The system as recited in claim 16, further comprising a power source for at least one of the sensors.

* * * * *

UNITED STATES PATENT AND TRADEMARK OFFICE
CERTIFICATE OF CORRECTION

PATENT NO. : 10,489,863 B1  
APPLICATION NO. : 15/165854  
DATED : November 26, 2019  
INVENTOR(S) : Matheson Page 1 of 1

It is certified that error appears in the above-identified patent and that said Letters Patent is hereby corrected as shown below:

In the Claims

Column 17, Line 54, Claim 1, after "element" insert -- , --, therefore.

Column 18, Line 25, Claim 11, after "method" insert -- as --, therefore.

Signed and Sealed this  
Seventeenth Day of March, 2020

Andrei Iancu  
*Director of the United States Patent and Trademark Office*